Patented July 14, 1931

1,814,124

UNITED STATES PATENT OFFICE

STEPHEN P. BURKE, OF NEW YORK, N. Y., ASSIGNOR TO COMBUSTION UTILITIES CORPORATION, OF NEW YORK, N. Y., A CORPORATION OF MAINE

SYNTHETIC RESIN AND PROCESS OF MAKING SAME

No Drawing.  Application filed September 11, 1924. Serial No. 737,130.

This invention relates to synthetic resins and more particularly to a series of new and useful synthetic resins and a process of making said resins.

It is well-known that phenol and the cresols are capable of reacting with formaldehyde or other compounds containing a reactive methylene radical to yield either soluble-fusible or insoluble-infusible condensation products, depending upon the conditions under which the reaction takes place.

The resins of the soluble-fusible class (bakelite A and B) are in general the intermediate or partial reaction products obtained in the condensation of phenol or one or more cresols with formaldehyde or one of its polymers. Such resins are plastic, soluble in methyl and ethyl alcohols, acetone, and related solvents, but completely insoluble in benzene. They are used as varnishes, lacquers and enamels.

The resins of the insoluble-infusible class (bakelite C) are in general the complete reaction products of similar condensations, and are commonly prepared by subjecting the resins of the soluble-fusible class to heat and pressure in either a mold or an autoclave. These resins, prepared in sheets, tubes, laminae, and other forms, and modified in properties by the presence of inert fillers, are used in radio apparatus, magneto parts, silent gears, and in a wide variety of other articles.

Experience in the manufacture of the insoluble-infusible resins has revealed only a limited number of phenols which are capable of yielding satisfactory condensation products with formaldehyde. Phenol itself and the meta- and para-cresols yield the most widely useful products. Ortho-cresol is not so serviceable, since partial condensation products prepared therefrom do not readily harden in the mold. Accordingly it is regarded as undesirable in "thermo-setting" compositions, and is carefully removed by distillation from the other cresols. The xylenols also yield a poor quality of resin, and "in the field of higher homologues of phenol the proportion of inert or non-resin-forming or crystalline bodies increases" (Carleton Ellis, "Synthetic Resins and Their Plastics" (1923), page 95). For this and other reasons the phenol-formaldehyde and other resins now prepared for the industrial market are manufactured principally from pure phenols and from meta- and para-cresols, specially refined by distillation. Nevertheless the hardness, brittleness and lack of toughness and elasticity have limited the scope of application of these resins, and many attempts have been made to improve their properties by the addition of various softening agents during the process of their manufacture. The cresols are obtained exclusively from coke oven and gas works tars, which contain about 2% of the cresols and about 1% of phenol. Phenol is also manufactured synthetically to insure a supply adequate for the demand. Since these compounds are expensive to recover or produce, it follows that the synthetic resins prepared from them are likewise expensive products.

The primary object of the present invention is to produce a series of synthetic resins, both soluble-fusible and insoluble-infusible of excellent quality, the composition and properties of which are markedly different from those of the synthetic resins now known to commerce.

Another object of the invention is to provide a series of new and useful synthetic resins and a process of making the same at a cost which is considerably less than that of the synthetic phenol-formaldehyde resins now known to commerce.

Another object of the invention is to provide a series of new and useful synthetic resins and a simple and economical process for making the same that reduces their hardness and brittleness and increases their toughness and elasticity.

With these and other objects in view the invention consists essentially in the new compositions and process of making the same hereinafter described and particularly defined in the claims.

The compositions forming the subject-matter of the present invention are prepared as the intermediate or complete reaction products obtained by the condensation of formaldehyde or its polymers with the tar acids recoverable from a primary or only partially decomposed primary tar such as is obtainable by the low temperature distillation of coal or other bituminous material under suitable conditions of temperature and pressure. These primary tar acids are not phenols and their composition will be made clear by the following discussion.

In the co-pending application of Henry O. Loebell, Serial No. 640,828, filed May 23, 1923, for the "Manufacture of fuel gas," and in Patent No. 1,426,159, granted August 15, 1922, to Henry L. Doherty, two processes are described by either of which fuel can be carbonized and gasified with the production of combustible gas, coke and of tars of a primary nature. In these methods the coal, lignite, shale, or other bituminous material is passed downward through a shaft furnace, and is subjected to a fractional distillation with a rising current of hot gases. The fuel in its downward passage encounters gases at constantly increasing temperature and consequently loses a constantly increasing portion of its volatile constituents. The volatile constituents are carried up by the heating gases into cooler regions without being exposed to temperatures much in excess of those at which they are liberated from the fuel substance. Hence, the tar vapors are not decomposed or "cracked", but can be subsequently condensed without material alteration of their composition. The name of "primary tar" is given to this liquid product of the carbonization of bituminous materials at comparatively low temperatures.

When bituminous coal is thus distilled, the tar yield is about double that obtained in the coke-oven or coal-gas-retort where the severe carbonizing conditions that prevail decompose into gas about half of the primary tar first formed and greatly alter the composition of the surviving tar. Thus, whereas coke-oven tar rarely contains over 5% of tar acids, primary tars in general contain from 10% to 50%, and those produced from bituminous coal averages from 20% to 30% of tar acids. Moreover, while more than 75% of the coke-oven tar-acids boil below 215° C., less than 40% of the primary tar-acids commonly boil below this temperature.

These primary tar acids have been examined and found to differ markedly in composition from the phenols of coke-oven or gas-works tar. Phenols are defined (e. g. by A. F. Holleman, Organic Chemistry (1920) page 409) as "compounds derived from the aromatic hydrocarbons by replacement of one or more of the hydrogen atoms of the nucleus by hydroxyl". There is present in the phenol fraction of coke-oven tar a small proportion of the higher homologues of phenol which have the same boiling point as the primary tar-acids. A comparison of these high boiling phenols and the primary tar-acids of the same boiling point shows the following points of difference: The primary tar-acids have a higher molecular-weight, a lower refractive index, and a density at least fifteen one-thousandths (.015) lower than the phenolic homologues of the same boiling point. The primary tar-acids yield solid derivatives having melting points higher than the same derivatives of the phenols. Accordingly the primary tar-acids cannot be regarded as phenols, or "compounds derived from the aromatic hydrocarbons by replacement by one or more of the hydrogen atoms of the nucleus by hydroxyl" groups, but rather must apparently be defined as compounds derived from hydro-aromatic or cyclic unsaturated hydrocarbons. For example, the series of the primary tar acids has been found to contain hydrogenated and alkylated derivatives of naphthol, but neither alpha- nor beta-naphthol, both of which are present in coke oven tar.

The intermediate and complete reaction products of the condensation of these cyclic unsaturated hydroxy compounds, or primary tar acids, with formaldehyde are quite different from the intermediate and complete reaction products obtained from the condensation of phenols with formaldehyde. Some of the facts leading up to this conclusion may be summarized as follows: Ammonia, which is commonly used as a condensing agent in the production of an insoluble and infusible resin from phenols, is quite ineffective in the condensation of primary tar-acids with formaldehyde, and it is necessary to use stronger alkalies for their condensation, such as sodium carbonate and sodium or potassium hydroxide. The high-boiling phenols are not adapted to the manufacture of thermo-setting compositions, while the intermediate reaction products obtained from the high boiling primary tar-acids harden very satisfactorily in the mold and are excellently adapted to the manufacture of thermo-setting compositions. While the initial reaction products obtained by condensing formaldehyde with hexahydrophenol are readily and completely soluble in benzene, and the similar reaction products obtained by the use of primary tar-acids with formaldehyde are appreciably soluble in benzene at room temperature, the initial reaction products (bakelite A) obtained by the use of phenols and formaldehyde are completely insoluble in benzene at room temperature.

As previously stated, when bituminous material is distilled under low temperature conditions, such as those described, the yield of primary tar is about double the yield of the high temperature tar obtained from the same material under the severe carbonizing conditions which prevail in a coke oven. Moreover, the primary tars will generally contain twenty to thirty percent of tar-acids, whereas coke-oven tar rarely contains over five percent of phenols. Accordingly it will be apparent that a ton of coal will yield by low temperature distillation about ten times the volume of such primary tar-acids as it yields of phenols in coke-oven carbonization, and that the synthetic resins prepared from primary tar acids will therefore be cheaper than those prepared from phenols as a result of the greater abundance of raw material.

In the manufacture of this series of new synthetic resins a variety of modifications of the general process is possible. The essential feature is the employment of oils containing high boiling primary tar-acids or cyclic unsaturated hydroxy compounds of the nature described. Experiments have proven that cheap and high quality resins of the insoluble and infusible type can be produced by directly condensing with formaldehyde or its equivalent the primary tar-acids while they are associated in admixture with cyclic non-aromatic hydrocarbons of the composition and preferably in substantially the same proportions as they are found in the distillate of primary or only partially decomposed primary tar. Thus resins of high quality have been prepared by direct condensation from the distillates of primary tar, and a lower quality of resins has been prepared from the tar itself. The products thus obtained are not deteriorated by this simple and direct operation, but on the contrary are improved in certain qualities because of the fact that some of the "neutral oil", which is composed chiefly of cyclic unsaturated hydrocarbons, is either physically entrained or chemically dissolved in the liquid resins. The presence of this "neutral oil" favorably modifies the qualities of the resulting solid product by imparting to it elastic properties, so that after it has been subjected to heat and pressure it is tougher and does not possess the extreme hardness and brittleness which characterizes normal "bakelite C". Likewise by this process the steps of extracting the tar-acids from the tar or its distillates are eliminated, and the cost of the synthetic resins finally produced is thus reduced even below the low cost already indicated as possible owing to the greater abundance of raw material.

It has been found that the fraction of primary or partially decomposed primary tar which boils between 200° and 300° C. is best adapted to condensation reactions. While ammonia is the condensing agent or catalyst most generally in use in present day resin manufacture, the diluting action of the "neutral oils" which are present in the primary tar and its distillates makes it ineffective as an aid in the present reaction. It has been found necessary to use sodium carbonate to effect satisfactory condensates or even sodium hydroxide if brittle products are desired. One to four volumes of the distillates to one volume of thirty to forty per cent formaldehyde solution have been found capable of satisfactory yields, although with a wide variation of concentrations it has been possible to prepare products of varying properties in accordance with present practice. Furfural, paraformaldehyde, trioxy-methylene or any similar compound containing a reactive methylene radical can be used in the place of formaldehyde and sometimes with advantage.

A typical resin of the series forming the subject of the present invention can be prepared by mixing one volume of commercial forty per cent formaldehyde solution with three volumes of the oil containing the high boiling primary tar-acids just described. To this mixture is added two to ten per cent by weight of sodium carbonate solution and the whole is heated in an autoclave or in an open vessel equipped with a reflux condenser to a temperature of 120° to 185° C. Heating, with or without pressure is continued until there remains only a small proportion of the primary tar-acids in the oil. The residual mixture is then allowed to separate into layers, and on cooling the bottom layer forms a semi-solid mass which is fusible, and at least partially soluble in benzene, alcohol, ether, acetone, acetic acid and other like solvents, and can be used for making lacquers, varnishes, enamels and polishes.

To transform this fusible-soluble resin into an insoluble and infusible type, it is heated at elevated temperatures in a closed vessel under pressure, or it may be further treated with formaldehyde or its equivalent, with heat. The infusible and insoluble resin thus produced is tough and possesses a high degree of elasticity, whereas the ordinary bakelite C is hard and brittle. Before beginning this final heat treatment, the soluble-fusible intermediate resins may be compounded with various filling materials, such as wood flour or asbestos, in order to modify the properties of the final product, and the resulting mixture is then heated, molded, pressed and cured to form a variety of products. The final insoluble and infusible resinous products are fireproof and possess a high dielectric strength and durable qualities, which in combination with their high elasticity make them superior to any other known resinous materials for use in the manufacture of electrical instruments, machinery parts, laminated products and impregnating and insulating media.

While the primary tar produced by the

Doherty and Loebell processes described above is particularly suited to the manufacture of the new and useful synthetic resins forming the subject matter of this invention, other primary or only partially decomposed primary tars produced under suitable conditions of temperature and pressure by other means may be employed, and accordingly it is not intended to limit the present invention to condensation products prepared from any particular class of primary or only partially decomposed primary tars.

The term "formaldehyde" as used in the claims is intended to include not only formaldehyde itself, but also its polymers and other compounds containing a reactive methylene radical.

The terms "cyclic unsaturated hydroxy compounds" and "primary tar acids" have been adopted in the absence of a well recognized group name to describe the high boiling alkali-soluble organic compounds which apparently consist largely of hydroxyl derivatives of the hydroaromatic or cyclic unsaturated hydrocarbons, and of which at least fifty per cent boil above 220° C., and which are found in large quantities in a primary or only partially decomposed primary tar.

The terms "neutral oil" and "cyclic non-aromatic hydrocarbons" have been used synonymously to describe the mixture of hydrocarbon oils which make up at least fifty per cent of primary or only partially decomposed primary tar, and which consist largely of cyclic unsaturated hydrocarbons together with smaller amounts of paraffins and naphthenes. The term "moldable and heat-hardenable resins", as employed in this specification and claims, refers to the resinous product made by the present process, and which is fusible and soluble in the ordinary organic solvents, but is both hardenable and convertible by heat into the infusible and insoluble form, resembling "bakelite C".

Having thus described the preferred form of the invention, I claim:

1. A moldable and heat-hardenable synthetic resin comprising the resinous reaction product produced by reacting a mixture of primary tar acids, unsaturated hydroaromatic hydrocarbons and formaldehyde, in the presence of an alkaline condensation agent stronger than ammonia.

2. The process of making synthetic resins which comprises condensing a primary tar distillate with formaldehyde in the presence of a solution of an alkaline compound of an alkali metal thereby producing a moldable and heat hardenable resinous product, subsequently separating the resinous reaction product from the residual liquids and treating the said product under conditions adapted to convert it into the insoluble and infusible form.

3. The process for making synthetic moldable and heat-hardenable resins which comprises reacting with formaldehyde a mixture containing primary tar acids and unsaturated hydro-aromatic hydrocarbons.

4. The process for making synthetic moldable and heat-hardenable resins which comprises reacting with formaldehyde a mixture of primary tar acids and unsaturated hydro-aromatic hydrocarbons of the composition and in substantially the same proportions that they are naturally formed in a primary tar, in the presence of a small amount of a solutiton of a nonvolatile alkaline compound.

5. The process for making synthetic moldable and heat-hardenable resins which comprises reacting with formaldehyde in the presence of a nonvolatile alkaline catalyst, upon a distillate of primary coal tar.

6. The process for the manufacture of synthetic moldable, and heat-hardenable resins which comprises reacting formaldehyde with an oil containing primary tar acids and cyclic unsaturated non-aromatic hydrocarbons in the presence of an alkaline condensing agent stronger than ammonia.

7. The process for the manufacture of synthetic moldable and heat-hardenable resins which comprises reacting a primary coal tar with formaldehyde in the presence of a solution of an alkaline compound of an alkali metal, the latter functioning as a condensing agent.

8. The process for the manufacture of synthetic moldable and heat-hardenable resins which comprises heating together one volume of commercial 40% formaldehyde solution, 1 to 4 volumes of a tar distillate containing primary tar acids and unsaturated polynuclear non-aromatic hydrocarbons, together with a small amount of a solution of an alkaline compound of an alkali metal, the latter functioning as a condensing agent, whereby a condensing reaction occurs and a resinous product is formed, which is both hardenable and convertible by heat to an insoluble and infusible form, and separating the said resinous product from the residual liquid.

9. The process for the manufacture of synthetic moldable and heat-hardenable resins which comprises condensing with formaldehyde in the presence of a basic catalyst stronger than ammonia, the fractional distillate boiling between 200° and 300° C. of a primary coal tar, and separating the resultant resinous condensation product from the residual liquids.

10. The process for the manufacture of synthetic moldable and heat-hardenable resins which comprises reacting with one volume of 40% commercial formaldehyde solution upon one to four volumes of a low temperature tar distillate containing primary tar acides and neutral oil and having a boiling range whose upper limit is no higher than 300° C., in the presence of an alkaline catalyst stronger than ammonia, thereby producing a synthetic resin having properties of being moldable and convertible by heat to a hard, infusible, and insoluble state, separating the resinous product from the residual liquid, and subsequently treating the said resinous product to convert it into a tough and elastic insoluble and infusible synthetic resin.

11. A process for the manufacture of synthetic moldable and heat hardenable resins which comprises the step of reacting upon a primary tar oil with a mixture consisting of formaldehyde and an alkaline condensing agent stronger than ammonia.

12. The method of forming phenol condensation products directly from coal tar oils, which comprises adding a coal tar oil boiling below 220° C. containing tar acids, a solution having the power to extract tar acids from the tar oil, and to catalyze the condensation reaction of the said tar acids with an aldehyde, an aldehyde-bearing substance, together, boiling said mixture until the condensation reaction between the said tar acids and the said aldehyde-bearing material has occurred, then allowing said mixture to separate into three immiscible layers, the top layer having oily compounds therein, the middle layer having substances in aqueous solution, and the bottom layer having a hardenable resinous material, and separating said layers from each other.

13. The method of forming phenol condensation products directly from coal tar oils, which comprises mixing together a coal tar oil boiling below 300° C. containing tar acids, a solution having the power to extract tar acids from the tar oil and to catalyze the condensation reaction of the said tar acids with an aldehyde, and formaldehyde, heating said mixture until the condensation reaction between the said tar acids and formaldehyde has occurred, and then separating from the said mixture a hardenable resinous material.

14. The process of making synthetic resins which comprises reacting a primary tar distillate with formaldehyde at temperatures adapted, in the presence of a basic condensing agent stronger than ammonia, to produce a resinous condensation product transformable by heat into the insoluble and infusible form, thereafter separating the said condensation product from the reaction mixture and treating the former to convert it to the said insoluble and infusible form.

15. The process for making synthetic moldable and heat hardenable resins which comprises, heating about three volumes of a primary tar distillate with one volume of commercial 40% formaldehyde, in the presence of 2% to 10% by weight of a solution of sodium carbonate.

16. The method of forming a heat hardenable synthetic resin of the phenol-formaldehyde type which comprises the steps of heating a reaction mixture comprising a coal tar distillate containing tar acids and an aldehyde-containing substance in the presence of an alkaline catalyst of a base stronger than ammonia under conditions to cause a condensation reaction to occur between the tar acids present in the coal tar distillate and the said aldehyde-containing substance, allowing the mixture to separate into three immiscible layers, one layer of which comprises a heat hardenable synthetic resin adapted to be converted by heat into the insoluble and infusible form, and separating the said heat hardenable resin from the other immiscible layers.

In testimony whereof I affix my signature.

STEPHEN P. BURKE.